United States Patent Office 3,435,011
Patented Mar. 25, 1969

3,435,011
MODIFIED POLYMERS OF CONJUGATED DIENES
Carl A. Uraneck and William J. Trepka, Bartlesville, Okla., assignors to Phillips Petroleum Company, a corporation of Delaware
No Drawing. Filed Dec. 7, 1964, Ser. No. 416,612
Int. Cl. C08d 1/32, 3/04, 3/02
U.S. Cl. 260—80.7                17 Claims

ABSTRACT OF THE DISCLOSURE

Polymers of conjugated dienes, having reduced tendency to cold flow, are made by polymerizing the conjugated diene monomer with an organoalkali metal catalyst and adding to the polymerization reaction mixture a small amount of a halogenated compound selected from the group consisting of chloroprene, vinylidene chloride, halogenated styrenes and halogenated vinylnaphthalenes.

---

This invention relates to modified polymers of conjugated dienes and their method of manufacture. In one aspect, this invention relates to the making of modified polymers having a reduced tendency to cold flow and an increased Mooney viscosity. In another aspect this invention relates to a novel composition of a conjugated diene polymer polymerized in the presence of a modifying agent which reduces the tendency of the polymer to cold flow an increases its Mooney viscosity.

In the past few years a great deal of research work has been conducted with the object of producing improved rubbery polymers. Several polymer products have been developed that have superior properties over natural rubber that make them particularly suitable for the application of automobile and truck tires and other articles. Examples of these polymers include polybutadienes and copolymers of butadiene and styrene. However, it has been found that certain of these polymers are subject to cold flow while they are in the uncured state. Cold flow of uncured polymers presents many problems, particularly in packaging, shipping, and storage. For example, if cracks or punctures develop in the package used for storing the polymers, polymer will flow from the package with a resulting loss or contamination and sticking together of the stacked packages. It is possible to cross link molecules of these polymers in order to reduce cold flow. But such an approach is undesirable where the polymers must later be compounded in masticating equipment. The formation of relatively high amounts of gel as a result of gross linking greatly reduces the ease with which the polymers can be mixed with other materials and fabricated. It is, therefore, highly desirable to produce such polymers having a reduced tendency to cold flow and increased Mooney viscosity without the formation of gel.

It is an object of this invention to provide a method for producing modified polymers of conjugated dienes having a reduced tendency to cold flow and an increased Mooney viscosity in the unvulcanized state. Another object of the invention is to provide a method for producing copolymers of conjugated dienes with vinyl substituted aromatic compounds which have a reduced tendency to cold flow and an increased Mooney viscosity. Still another object of this invention is to provide a novel homopolymer prepared by polymerizing a conjugated diene in the presence of a modifying agent which prevents or substantially reduces cold flow and increases the Mooney viscosity. Still another object of this invention is to provide a novel copolymer of a conjugated diene and a vinyl substituted aromatic compound that is polymerized in the presence of a modifying agent which prevents or substantially reduces cold flow and increases the Mooney viscosity.

Other aspects, advantages and objects of this invention will be apparent to those skilled in the art upon consideration of the accompanying disclosure and claims.

We have discovered that polymers can be produced, having a reduced tendency to cold flow and an increased Mooney viscosity, by adding a small amount of a halogenated compound selected from the group consisting of chloroprene, vinylidene chloride, a nuclear halogen containing styrene wherein at least one halogen substituent is present in a 2 or 4 position, a nuclear halogen containing 1-vinylnaphthalene wherein at least one halogen substituent is present in a 2 or 4 position, and a nuclear halogen containing 2-vinylnaphthalene wherein at least one halogen substituent is present in a 1 or 3 position to a polymerization system wherein a conjugated diene homopolymer or a copolymer of a conjugated diene with a vinyl substituted aromatic compound is produced in the presence of an organo alkali metal catalyst.

According to this invention polymers with reduced cold flow are prepared by adding to the polymerization mixture from 0.1 to 5 millimoles per hundred grams of monomer or monomers charged of a halogen containing polymerizable compound selected from the group consisting of chloroprene, vinylidene chloride, halogen substituted aromatic compounds having the formula:

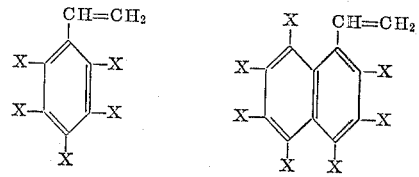

and

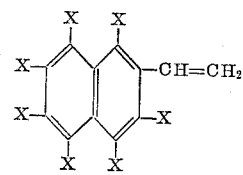

wherein X is selected from the group consisting of hydrogen, chlorine, bromine, iodine, alkyl groups containing 1–6 carbons atoms and cycloalkyl groups containing up to 6 carbon atoms. The total number of carbon atoms in the X groups does not exceed 6. The X groups can be the same or different. When the compound is a halogenated styrene or a halogenated 1-vinylnaphthalene, at least one of the X groups in the 2 or 4 position must be a halogen atom. When the compound is a halogenated 2-vinylnaphthalene, at least one of the X groups in the 1 or 3 position must be a halogen atom. The use of this very small amount of the above described halogen-containing compound, hereinafter called a "modifying agent," has a pronounced effect on the cold flow of the polymer but does not produce gel in any amount.

Examples of the halogen containing styrenes and halogen containing vinyl naphthalenes that can be used in the practice of this invention include:

2-chlorostyrene
4-chlorostyrene
2-bromostyrene
4-bromostyrene
2-iodostyrene
4-iodostyrene
2,4-dichlorostyrene
2,5-dichlorostyrene
2,3-dibromostyrene
2,4,6-trichlorostyrene
2,4-dichloro-3-iodostyrene
2-chloro-4-bromostyrene
2,3,4,6-tetrachlorostyrene
2-chloro-5-methylstyrene
2-bromo-3,5-di-n-propylstyrene
2,6-diiodo-4-tert-butylstyrene
4-chloro-3-n-hexylstyrene
2-chloro-4-cyclohexylstyrene
4-bromo-3-methyl-5-n-pentylstyrene
2-iodo-5-cyclopentylstyrene
2-chloro-1-vinylnaphthalene
4-chloro-1-vinylnaphthalene
2-bromo-1-vinylnaphthalene
4-bromo-1-vinylnaphthalene
2-iodo-1-vinylnaphthalene
4-iodo-1-vinylnaphthalene
2,4-dichloro-1-vinylnaphthalene
2,3,4-trichloro-1-vinylnaphthalene
2,3,4,5-tetrachloro-1-vinylnaphthalene
2,3,4,5,6-pentachloro-1-vinylnaphthalene
2,4,7-trichloro-1-vinylnaphthalene
3,4,7,8-tetrachloro-1-vinylnaphthalene
2-chloro-4-methyl-1-vinylnaphthalene
2,3-dimethyl-4-chloro-1-vinylnaphthalene
2,4-dichloro-5-methyl-6-ethyl-1-vinylnaphthalene
2,3,4,5,6,7,8-heptachloro-1-vinylnaphthalene
2,4,5-trichloro-3,6,7,8-tetramethyl-1-vinylnaphthalene
2,4-dichloro-5-cyclopentyl-1-vinylnaphthalene
2,4-dibromo-3-methyl-1-vinylnaphthalene
2,3,4-tribromo-5-propyl-1-vinylnaphthalene
2-bromo-3,4,8-trimethyl-1-vinylnaphthalene
2-butyl-3-ethyl-4-bromo-1-vinylnaphthalene
2,3,4,5,6-pentabromo-1-vinylnaphthalene
2,4-dibromo-5,6,7,8-tetramethyl-1-vinylnaphthalene
2,4-diiodo-1-vinylnaphthalene
2-iodo-4-methyl-1-vinylnaphthalene
2,4-diiodo-5,7,8-trimethyl-1-vinylnaphthalene
3,4-dimethyl-2-iodo-6-ethyl-1-vinylnaphthalene
3,4-diiodo-5-butyl-7-methyl-1-vinylnaphthalene
2,3,4,6,8-pentaiodo-1-vinylnaphthalene
1-chloro-2-vinylnaphthalene
3-chloro-2-vinylnaphthalene
1-bromo-2-vinylnaphthalene
3-bromo-2-vinylnaphthalene
1-iodo-2-vinylnaphthalene
3-iodo-2-vinylnaphthalene
1,3-dichloro-2-vinylnaphthalene
1,3-dibromo-2-vinylnaphthalene
1,3-diiodo-2-vinylnaphthalene
1,3-dichloro-4-methyl-2-vinylnaphthalene
1-chloro-3,4,5,6-tetramethyl-2-vinylnaphthalene
1,3-dichloro-4-methyl-6-ethyl-2-vinylnaphthalene
1,3-dichloro-5-butyl-6,8-dimethyl-2-vinylnaphtthalene
3-chloro-4-cyclopentyl-2-vinylnaphthalene
1,3-dichloro-4,5-diethyl-7,8-dimethyl-2-vinylnaphthalene
1-bromo-3,4-dimethyl-2-vinylnaphthalene
1,3-dibromo-4,5,6-trimethyl-7-propyl-2-vinylnaphthalene
1-bromo-3-ethyl-4-propyl-5-methyl-2-vinylnaphthalene
1,3-dibromo-4,5,6,7,8-pentamethyl-2-vinylnaphthalene
1,3,4,5,6,7,8-heptabromo-2-vinylnaphthalene
3-iodo-4-methyl-2-vinylnaphthalene
1,3-diiodo-4-methyl-5,7-diethyl-2-vinylnaphthalene
1,3-diiodo-4,5,6,7,8-pentamethyl-2-vinylnaphthalene
1,3-diiodo-4-cyclohexyl-2-vinylnaphthalene
1,3,4,5,6,7,8-heptaiodo-2-vinylnaphthalene and the like.

Not all halogen-containing compounds are operable in this invention. It might be expected that vinyl chloride would give the desired results in view of the improvements realized with vinylidene chloride, but such is not the case. There is no noticeable effect on cold flow when vinyl chloride is used. Halogen-substituted styrene compounds are preferred in the practice of this invention.

The polymers which can be prepared according to this invention are broadly polymers of conjugated dienes, more specifically conjugated dienes containing from 4–12 carbon atoms per molecule, and preferably those which contain from 4–8 carbon atoms per molecule. Examples of these monomers include: 1,3-butadiene, isoprene, piperylene, 2,3-dimethyl-1,3-butadiene, 1,3-octadiene, 4,5-diethyl-1,3-octadiene, and the like. These conjugated dienes can be polymerized to form homopolymers or they can be copolymerized one with another. Conjugated dienes can also be copolymerized with one or more monovinylidene-containing monomers such as styrene and alkyl styrenes, e.g., 3 - methylstyrene, 3,5 - diethylstyrene, 4-n-propylstyrene, 2,4,6-trimethylstyrene, 3-methyl-5-n-hexylstyrene, 2,3,4,5 - tetramethylstyrene, 4 - dodecylstyrene, 4 - cyclohexylstyrene, 4 - phenylstyrene, 4-p-tolylstyrene, and the like.

The conjugated dienes can also be copolymerized with other monovinylidene-containing monomers such as: 1-vinylnaphthalene, 2-vinylnaphthalene, 4-methyl-1-naphthalene, 3-ethyl-2-vinylnaphthalene, 4,5-dimethyl-1-vinylnaphthalene, 4,5-diethyl-2-vinylnaphthalene, 6-isopropyl-1-vinylnaphthalene, 2,4 - diisopropyl-1-vinylnaphthalene, 4-n-propyl-5-n-butyl-2-vinylnaphthalene, and the like.

The polymers of the above-listed compounds are prepared by contacting the monomer or monomers which it is desired to polymerize with an organo alkali metal compound, including mono and polyalkali metal compounds in the presence of a hydrocarbon diluent. The organo alkali metal compounds preferably contain from 1–4 alkali metal atoms per molecule. As will be explained hereinafter, lithium is a preferred alkali metal.

The organo alkali metal compounds that are used as catalysts can be prepared in several ways, for example, by replacing halogens in an organic halide with alkali metals, by direct addition of alkali metals to a double bond, or by reacting an organic halide with a suitable alkali metal compound.

While organo compounds of the various alkali metals can be employed in carrying out the polymerization, by far the best results are obtained with organolithium compounds which give very high conversions to a terminally reactive polymer. The alkali metals, of course, include sodium, potassium, lithium, rubidium, and cesium.

The organo alkali metal initiators can be represented by the formula $RM_x$ wherein R is a hydrocarbon radical selected from the group consisting of aliphatic, cycloaliphatic, and aromatic radicals containing from 1–20 carbon atoms, M is an alkali metal, and $x$ is an integer from 1 to 4. The preferred initiators are organolithium compounds wherein $x$ is 1 or 2. Examples of the organo alkali metal compounds that can be used as catalyst include:

methyllithium
n-butyllithium
tert-butyllithium
amylpotassium
isopropylcesium
n-decyllithium
phenyllithium
naphthyllithium
1,4-dilithiobutane
1,5-dipotassiopentane
1,4-disodio-2-methylbutane
1,6-dilithiohexane
1,10-dilithiodecane
1,15-dipotassiopentadecane
1,20-dilithioeicosane
1,4-disodio-2-butene
1,4-dilithio-2-methyl-2-butene
1,4-dilithio-2-butene
1,4-dipotassio-2-butene
dilithionaphthalene
1,4-dilithiomethylnaphthalene
disodionaphthalene
4,4'-dilithiobiphenyl
disodiophenanthrene
dilithioanthracene
1,2-dilithio-1,1-diphenylethane
1,2-disodio-1,2,3-triphenylpropane
1,2-dilithio-1,2-diphenylethane
1,2-dipotassiotriphenylethane
1,2-dilithiotetraphenylethane
1,2-dilithio-1-phenyl-1-naphthylethane
1,2-dilithio-1,2-dinaphthylethane
1,2-disodio-1,1-diphenyl-2-naphthylethane
1,2-dilithiotrinaphthylethane
1,4-dilithiocyclohexane
2,4-disodioethylcyclohexane
3,5-dipotassio-n-butylcyclohexane
1,3,5-trilithiocyclohexane
1-lithio-4-(2-lithiomethylphenyl)butane
1,2-dipotassio-3-phenylpropane
1,2-di(lithiobutyl)benzene
1,3-dilithio-4-ethylbenzene
1,4-dirubidiobutane
1,8-dicesiooctane
1,5,12-trilithiododecane
1,4,7-trisodioheptane
1,4-di(1,2-dilithio-2-phenylethyl)benzene
1,2,7,8-tetrasodionaphthalene
1,4,7,10-tetrapotassiodecane
1,5-dilithio-3-pentyne
1,8-disodio-5-octyne
1,7-dipotassio-4-heptyne
1,10-dicesio-4-decyne
1,11-dirubidio-5-hendecyne
1,2-disodio-1,2-diphenylethane
dilithiophenanthrene
1,2-dilithiotriphenylethane
1,2-disodio-1,2-diphenylethane
dilithiomethane
1,4-dilithio-1,1,4,4-tetraphenylbutane
1,4-dilithio-1,4-diphenyl-1,4-dinaphthylbutane
and the like.

The amount of initiator used depends upon the organoalkali metal compound and the type of polymer desired. The effective initiator level is normally in the range of about 0.25 to 20 millimoles per 100 grams of monomer(s) charged to the polymerization. Organoalkali metal initiators vary greatly in their solubility and this has a considerable effect on the amount used. Compounds which are very soluble in hydrocarbon diluents, such as butyllithium, amyllithium, and the like, are used in relatively small amounts, i.e., amounts in the lower portion of the specified range. Those which possess limited solubility can be used in larger amounts, the least soluble compounds being used in the larger quantities. In any event the initiator level is adjusted, together with the branching agent, to yield a polymer with an inherent viscosity in the range of 1.0 to 3.5.

It is preferred that the polymerization be conducted in the presence of a suitable diluent such as benzene, toluene, xylene, cyclohexane, methylcyclohexane, n-butane, n-hexane, n-heptane, isooctane, mixtures of these, and the like. Generally the diluent is selected from hydrocarbons, e.g., paraffins, cycloparaffins, and aromatics containing from 4–10 carbon atoms per molecule.

The cold flow of the final product is substantially reduced by incorporating the modifying agent into the polymerization mixture at any time prior to inactivation of the catalyst. The compound is added in an amount ranging from 0.1 to 5 millimoles per 100 grams of monomer(s) charged. If the modifying agent is introduced toward the end of the polymerization period, sufficient time must be allowed subsequent to this addition to permit the desired modification to occur. The time required will depend to some extent upon the temperature. Generally from 10 minutes to 25 hours is adequate for satisfactory results. The treating temperature is generally the same as the polymerization temperature, although in some instances it may be desirable to use higher or lower temperatures in the treating step. The beneficial results of this invention are also obtained when the modifying agent is added to the reaction mixture prior to initiation or during the early stages of the polymerization.

While the polymerization temperature can vary over a broad range, e.g., from −100 to 150° C., it is preferred to operate at a temperature in the range of −75 to 75° C. The period required for polymerization and for reaction of the brushing agent can range from about 5 minutes to 100 hours although the time is ordinarily in the range of about 10 minutes to 25 hours.

Various materials are known to be destructive to organoalkali metal catalysts. These materials include carbon dioxide, oxygen, water, alcohols, mercaptans, and primary and secondary amines. It is highly desirable, therefore, that the monomers be freed of these materials as well as other materials which tend to inactivate the catalyst. Any of the known means for removing such contaminants can be used. Also, it is preferred that the solvent mixture used in the process be substantially free of impurities such as water, oxygen, and the like. In this connection, it is desirable to remove air and moisture from the reaction vessel in which the polymerization is conducted. Any reactive impurities are removed by the organoalkali metal catalyst which serves as a scavenger.

By appropriate regulation of the catalyst level and the modifying agent, products ranging from relatively low molecular weight, soft, easily processable rubbers to relatively high molecular weight polymers can be obtained. In cases where a high inherent viscosity rubber is desired, this invention is very useful in producing such a product without excessive cross linking and gel formation in such products. As stated hereinbefore, the process is concerned generally with preparing polymers having an inherent viscosity in the range of 1.0 to 3.5. However, the range is not to be construed to be unduly limiting.

After the polymer has been treated with the modifying agent and the required modifying is obtained, the system is then quenched with water, alcohol, acid, or other suitable reagent. By "quenching," it is meant to treat the polymerization reaction mixture to destroy organolithium still present. After the polymerization reaction mixture has been quenched, the polymer product can be coagulated by addition of an alcohol or other suitable agent and the solid polymer can then be separated by any conventional means, such as by filtration. The following examples are presented to further illustrate the invention, but it is not intended that the invention should be limited thereto. Lettered footnotes appear at the end of Table IV.

EXAMPLE I 1,3-butadiene was polymerized in the presence of n-butyllithium as the catalyst and 4-chlorostyrene, chloroprene, and vinylidene chloride as modifying agents. The following recipe was used:

| | |
|---|---|
| 1,3-butadiene, parts by weight | 100 |
| Cyclohexane, parts by weight | 780 |
| n-Butyllithium, mhm [1] | Variable |
| Modifying agent, mhm | Variable |
| Temperature, °F | 122 |
| Time, hours | Variable |

[1] mhm=millimoles per 100 grams monomer.

Charging procedures, designated as A, B, and C, were as follows:

A. Cyclohexane - nitrogen purge - butadiene-modifying agent-butyllithium-polymerization time, 6 hours.

B. Cyclohexane-nitrogen purge-butadiene-butyllithium-modifying agent-polymerization time, 6 hours.

C. Cyclohexane - nitrogen purge-butadiene - butyllithium-polymerization time, 3 hours-modifying agent-reaction continued either 3 or 12 hours as specified.

At the conclusion of the polymerization, a solution of 2,2′-methylene-bis(4-methyl-6-tert-butylphenol) antioxidant in isopropyl alcohol was added in an amount to provide one part per 100 parts by weight polymer. The products were recovered by coagulation in isopropyl alcohol and were separated and dried. In runs made according to charging procedure C, small sample was withdrawn after the first reaction period (prior to addition of the modifying agent) and added to isopropyl alcohol contatining a small quantity of antioxidant. The polymer was recovered by evaporation of the diluent and properties determined. These samples served as control runs. Data are summarized in Table I.

These data show that the cold flow of polybutadiene can be reduced and the inherent viscosity increased by having present in the polymerization mixture one of the modifying agents of the invention, and that the modifying agent can be present initially or after a substantial degree of polymerization has occurred. The increase in inherent viscosity as the amount of modifying agent is increased is indicative of the amount of branching. All of the polymer products were completely soluble in toluene showing that no gel was formed. The absence of gel formation indicates there was no cross linking.

TABLE I

| Run No. | BuLi, mhm | Modifying Agent Type | Modifying Agent mhm | Charging Procedure | Reaction Time, hours | Conv., percent [1] | Inh. Visc.[a] | Cold Flow, mg./min.[b] |
|---|---|---|---|---|---|---|---|---|
| 1 | 1.3 | 4-chlorostyrene | 0 | A | 6 | 96.0 | 1.94 | 36.5 |
| 2 | 1.3 | do | 0.2 | A | 6 | 96.0 | 1.95 | 33.3 |
| 3 | 1.3 | do | 0.8 | A | 6 | 92.0 | 2.08 | 2.36 |
| 4 | 1.3 | do | 1 | A | 6 | 100 | 3.24 | 0 |
| 5 | 1.3 | do | 2 | A | 6 | 100 | 3.51 | 0.22 |
| 6 | 1.3 | do | 3 | A | 6 | 98.0 | 3.68 | |
| 7 | 1.3 | do | 5 | A | 6 | 93.0 | 4.07 | |
| 8 | 1.4 | do | 0 | A | 6 | 100 | 1.58 | 160.0 |
| 9 | 1.4 | do | 0.8 | A | 6 | 100 | 2.09 | 7.14 |
| 10 | 1.4 | do | 1.0 | A | 6 | 100 | 2.05 | 4.98 |
| 11 | 1.4 | do | 1.4 | A | 6 | 100 | 2.35 | 0.47 |
| 12 | 1.5 | do | 0 | A | 6 | 100 | 1.38 | 220.7 |
| 13 | 1.5 | do | 1.0 | A | 6 | 100 | 1.84 | 9.15 |
| 14 | 1.5 | do | 1.2 | A | 6 | 100 | 1.97 | 5.63 |
| 15 | 1.5 | do | 1.4 | A | 6 | 100 | 2.26 | 1.30 |
| 16 | 1.3 | do | 0 | C | 3+3 | 100 | 1.97 | 141.5 |
| 17 | 1.3 | do | 0.25 | C | 3+3 | 100 | 1.94 | 16.0 |
| 18 | 1.3 | do | 0.50 | C | 3+3 | 100 | 2.14 | 24.1 |
| 19 | 1.3 | do | 0.75 | C | 3+3 | 100 | 2.40 | 7.64 |
| 20 | 1.3 | do | 1 | C | 3+3 | 100 | 2.53 | 2.70 |
| 21 | 1.3 | do | 2 | C | 3+3 | 100 | 3.17 | 0 |
| 22 | 1.3 | do | 3 | C | 3+3 | 100 | 3.21 | |
| 23 | 1.3 | do | 5 | C | 3+3 | 100 | 3.30 | |
| 24 | 1.4 | Chloroprene | 0 | B | 6 | 100 | 1.28 | 246.2 |
| 25 | 1.4 | do | 0.2 | B | 6 | 100 | 1.30 | 132.9 |
| 26 | 1.4 | do | 0.5 | B | 6 | 100 | 1.69 | 24.4 |
| 27 | 1.4 | do | 0.2 | C | 3+12 | 100 | 1.41 | 133.4 |
| 28 | 1.4 | do | 0.5 | C | 3+12 | 100 | 1.48 | 76.6 |
| 29 | 1.4 | Vinylidene chloride | 0 | B | 6 | 100 | 1.27 | |
| 30 | 1.4 | do | 0.5 | B | 6 | 100 | 1.33 | |
| 31 | 1.4 | do | 1.0 | B | 6 | 100 | 1.38 | |
| 32 | 1.4 | do | 1.5 | B | 6 | 100 | 1.47 | |
| 33 | 1.4 | do | 0 | C | 3+12 | 100 | 1.29 | |
| 34 | 1.4 | do | 0.5 | C | 3+12 | 100 | 1.34 | |
| 35 | 1.4 | do | 1.0 | C | 3+12 | 100 | 1.56 | |

[1] Based on total butadiene charged.
See footnotes a and b at end of Table IV.

EXAMPLE II

The random copolymerization of 1,3-butadiene and styrene was conducted in the presence of n-butyllithium as the catalyst, tetrahydrofuran as the randomizing agent, and 4-chlorostyrene and vinylidene chloride as modifying agents. The following recipe was used:

| | |
|---|---|
| 1,3-butadiene, parts by weight | 75 |
| Styrene, parts by weight | 25 |
| Cyclohexane, parts by weight | 780 |
| Tetrahydrofuran (THF), parts by weight | 1.0 or 1.5 |
| n-Butyllithium, mhm | Variable |
| Modifying agent, mhm | Variable |
| Temperature, °F. | 122 |
| Time, hours (total) | 5 |

Charging procedures designated as D, E, and F, were as follows:

D. Cyclohexane - nitrogen purge - butadiene - styrene-tetrahydrofuran - butyllithium - modifying agent - polymerization time, 5 hours.

E. Cyclohexane - nitrogen purge - styrene - butadiene-tetrahydrofuran - butyllithium - modifying agent - polymerization time, 5 hours.

F. Cyclohexane - nitrogen purge - butadiene - styrene-tetrahydrofuran - butyllithium - polymerization, 1,5 hours-modifying agent-reaction continued 3.5 hours.

Polymers were recovered as described in Example I. In runs made according to charging procedure F, a small sample was withdrawn after the initial reaction period (prior to addition of the modifying agent) and added to isopropyl alcohol containing a small quantity of antioxidant. The polymer was recovered by evaporation of the diluent and properties determined. These samples served as control runs. Data are summarized in Table II.

These data show an increase in inherent viscosity and Mooney as the modifying agent is increased. They also show that a significant effect on Mooney is achieved with a very small amount of branching agent.

TABLE II

| Run No. | THF, Parts | BuLi, mhm | Modifying Agent Type | Modifying Agent mhm | Charging Procedure | Reaction Time, hours | Conv., Percent [1] | Inh. Visc. [a] | ML-4 at 212° F. [c] |
|---|---|---|---|---|---|---|---|---|---|
| 1 | 1.0 | 1.3 | 4-chlorostyrene | 0 | D | 5 | 100 | 1.12 | 9.0 |
| 2 | 1.0 | 1.3 | ---do--- | 0.25 | D | 5 | 100 | 1.35 | 24.5 |
| 3 | 1.0 | 1.3 | ---do--- | 0.50 | D | 5 | 100 | 1.72 | 66.0 |
| 4 | 1.0 | 1.3 | ---do--- | 0.75 | D | 5 | 100 | 2.72 | 153.0 |
| 5 | 1.0 | 1.3 | ---do--- | 1.0 | D | 5 | 100 | 4.82 | 170.0 |
| 6 | 1.0 | 1.3 | ---do--- | 0 | F | 1.5+3.5 | 100 | 1.17 | 12.0 |
| 7 | 1.0 | 1.3 | ---do--- | 0.25 | F | 1.5+3.5 | 100 | 1.39 | 24.0 |
| 8 | 1.0 | 1.3 | ---do--- | 0.50 | F | 1.5+3.5 | 100 | 1.62 | 40.5 |
| 9 | 1.0 | 1.3 | ---do--- | 0.75 | F | 1.5+3.5 | 100 | 2.10 | 85.0 |
| 10 | 1.0 | 1.3 | ---do--- | 1.0 | F | 1.5+3.5 | 100 | 2.37 | 106.0 |
| 11 | 1.0 | 1.4 | Vinylidene chloride | 0 | E | 5 | 100 | 1.15 | 9.5 |
| 12 | 1.0 | 1.4 | ---do--- | 0.05 | E | 5 | 100 | 1.17 | 11.5 |
| 13 | 1.0 | 1.4 | ---do--- | 0.1 | E | 5 | 100 | 1.33 | 17.0 |
| 14 | 1.0 | 1.4 | ---do--- | 0.2 | E | 5 | 100 | 1.57 | 40 |
| 15 | 1.0 | 1.4 | ---do--- | 0.3 | E | 5 | 93.8 | 1.75 | 36 |
| 16 | 1.5 | 1.2 | ---do--- | 0 | D | 5 | 100 | 1.24 | 12.5 |
| 17 | 1.5 | 1.2 | ---do--- | 0.2 | D | 5 | 100 | 1.85 | 59 |
| 18 | 1.5 | 1.2 | ---do--- | 0 | F | 1.5+3.5 | 100 | 1.28 | 13.5 |
| 19 | 1.5 | 1.2 | ---do--- | 0.2 | F | 1.5+3.5 | 100 | 1.50 | 29 |

[1] Based on total butadiene and styrene charged.
See foot notes a and c at end of Table IV.

EXAMPLE III

A run was made for the polymerization of butadiene in the presence of n-butyllithium as the catalyst and 4-chlorostyrene as the modifying agent. The recipe was the same as in Example I with 1.4 mhm butyllithium and 1.4 mhm 4-chlorostyrene being used. Polymerization was conducted at 122° F. for 6 hours and the polymer was recovered as in Example I. It was evaluated in a tread stock recipe. Data are presented in Table III.

TABLE III

Raw polymer properties

| | |
|---|---|
| ML-4 at 212° F. [c] | 44.6 |
| Cold flow, mg./min. [b] | 0.6 |
| Inherent viscosity [a] | 1.97 |
| Gel, percent | 0 |

Compounding recipe, parts by weight

| | |
|---|---|
| Rubber | 100 |
| High abrasion furnace block | 50 |
| Zinc oxide | 3 |
| Stearic acid | 1 |
| Flexamine [1] | 1 |
| Resin 731 D [2] | 5 |
| Aromatic oil (Philrich 5) | 5 |
| Sulfur | 1.75 |
| NOBS special [3] | 1.1 |

Physical properties, cured 30 minutes at 307° F.

| | |
|---|---|
| $\nu \times 10^4$, moles/cc. [d] | 2.10 |
| 300% modulus, p.s.i. [e] | 1310 |
| Tensile, p.s.i. [e] | 2690 |
| Elongation, percent [e] | 480 |
| ΔT, ° F. [f] | 60.7 |
| Resilience, percent [g] | 73.7 |
| Shore hardness [h] | 63.5 |
| Gehman freeze point, ° F. | −93 |

Oven-aged 24 hours at 212° F.

| | |
|---|---|
| 300% modulus, p.s.i. [e] | 2270 |
| Tensile, p.s.i. [e] | 2270 |
| Elongation, percent [e] | 300 |
| ΔT, ° F. [f] | 48.2 |
| Resilience, percent [g] | 80 |
| Shore hardness [h] | 69.5 |

[1] Physical mixture containing 65 percent of a complex diarylamine-ketone reaction product and 35 percent of N,N'-p-phenylenediamine.
[2] Disproportionated pale rosin stable to heat and light.
[3] N-oxydiethylene benzothiazole-2-sulfenamide.

See footnotes a through h at end of Table IV.

The rubber had low cold flow and better processing properties than similar type polybutadiene rubbers. The data show that the vulcanizate had good physical properties.

EXAMPLE IV

The following recipe was employed for the random copolymerization of butadiene with styrene:

| | |
|---|---|
| 1,3-butadiene, parts by weight | 75 |
| Styrene, parts by weight | 25 |
| Cyclohexane, parts by weight | 780 |
| Tetrahydrofuran, parts by weight | 1.0 |
| n-Butyllithium, mhm | 1.3 |
| 4-chlorostyrene, mhm | 0.4 |
| Temperature, ° F. | 122 |
| Time, hours | 5 |

Charging procedure D described in Example II was employed. The polymer was recovered using the method of Example I. It was evaluated in a tread stock recipe. Data are presented in Table IV.

TABLE IV

Raw polymer properties

| | |
|---|---|
| ML-4 at 212° F. [c] | 41.5 |
| Inherent viscosity [a] | 1.51 |
| Gel, percent | 0 |

Compounding recipe, parts by weight

| | |
|---|---|
| Rubber | 100 |
| High abrasion furnace black | 50 |
| Zinc oxide | 3 |
| Stearic acid | 2 |
| Flexamine [1] | 1 |
| Aromatic oil (Philrich 5) | 10 |
| Sulfur | 1.75 |
| Santocure [2] | 1 |

Processing properties

| | |
|---|---|
| Compounded ML-4 at 212° F. [i] | 56.1 |
| Extrusion at 250° F. [j] | |
|   Inches/min. | 68.5 |
|   Grams/min. | 131.0 |
|   Rating (Garvey die) | 12− |

Physical properties, cured 30 minutes at 307° F.

| | |
|---|---|
| $\nu \times 10^4$, moles/cc. [d] | 1.36 |
| 300% Modulus, p.s.i. [e] | 1375 |
| Tensile, p.s.i. [e] | 3340 |
| Elongation, percent [e] | 555 |
| ΔT, ° F. [f] | 59.3 |
| Resilience, percent [g] | 68.0 |
| Shore hardness [h] | 58.5 |

See footnotes at bottom of Table IV.

Oven-aged 24 hours at 212° F.

| | |
|---|---|
| 300% Modulus, p.s.i.[e] | 1950 |
| Tensile, p.s.i.[e] | 2750 |
| Elongation, percent [e] | 380 |
| ΔT, °F.[f] | 52.7 |
| Resilience, percent [g] | 71.0 |
| Shore hardness [h] | 64.0 |

[1] As in Example III.
[2] N-cyclohexyl-2-benzothiazolesulfenamide.
[a] Inherent viscosity was determined as follows: one-tenth gram of polymer was placed in a wire cage made from 80 mesh screen and the cage was placed in 100 ml. toluene contained in a wide-mouth 4-ounce bottle. After standing at room temperature (approximately 77° F.) for 24 hours, the cage was removed and the solution was filtered through a C porosity sulfur absorption tube to remove any solid particles present. The resulting solution was run through a Medalia viscometer in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portions of the original sample. Determination of gel was made along with inherent viscosity determination. Polymers were soluble in toluene.
[b] Cold flow is measured by extruding the rubber through a ¼-inch orifice at 3.5 p.s.i. pressure and at a temperature of 50° C. (122° F.). After allowing 10 minutes to reach steady state, the rate of extrusion is measured and reported in milligrams per minute.
[c] Mooney (ML-4 at 212° F.)—ASTM D-1646-61, Mooney Viscometer, large rotor, 4 minutes, 212° F.
[d] $\nu \times 10^4$, moles/cc.—Determined by the swelling method of Kraus as given in Rubber World, 135, 67–73, 254–260 (1956). This value is the number of effective network chains per unit volume of rubber. The higher the number, the more the rubber is crosslinked.
[e] ASTM D-412-61T. Scott Tensile Machine L-6. Tests were made at 80° F.
[f] ASTM D-623-58. Method A, Goodrich Flexometer, 143 lbs./sq. inch load, 0.175 inch stroke. Test specimen is a right circular cylinder 0.7 inch in diameter and 1 inch high.
[g] ASTM D-945-59 (modified). Yerzley oscillograph. Test specimen is a right circular cylinder 0.7 inch in diameter and 1 inch high.
[h] ASTM D-1706-61. Shore Durometer, Type A.
[i] Compounded Mooney (MS 1½ at 212° F.)—ASTM D-1646-61, Mooney Viscometer, small rotor, 1.5 minutes, 212° F.
[j] Extrusion at 250° F.—No. ½ Royle Extruder with Gravey die. See Ind. Eng. Chem., 34, 1309 (1942). As regards the "rating" figure, 12 designates an extruded product considered to be perfectly formed whereas lower numerals indicate less perfect products.

The above data show the rubber had very good milling and extrusion properties and vulcanizate properties were also good.

Various modifications of this invention can be made in view of the foregoing disclosure without departing from the spirit and scope thereof.

We claim:

1. A process for making a polymer wherein a polymerization reaction mixture is formed by polymerizing monomers selected from the group consisting of conjugated dienes and conjugated dienes in admixture with vinyl substituted aromatic compounds, with an organo alkali metal catalyst, adding to said reaction mixture 0.1 to 5 millimoles of a halogenated compound per 100 grams of said monomers, said halogenated compound being selected from the group consisting of chloroprene, vinylidene chloride, and a compound having a formula selected from the group consisting of:

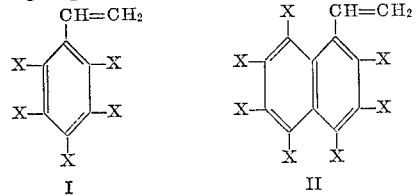

and

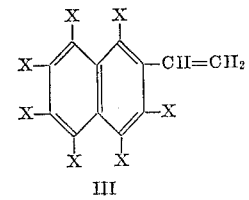

wherein X is selected from the group consisting of hydrogen, chlorine, bromine, iodine, alkyl containing 1-6 carbon atoms, and cycloalkyl containing up to 6 carbon atoms, the total carbon atoms in the X groups being not more than 6, when said compound has a formula selected from the group consisting of Formula I and Formula II at least one X is a halogen atom in the 2- or 4-position, and when said compound has Formula III at least one X is a halogen atom in the 1- or 3-position, and recovering a rubbery polymer product.

2. A process for making polymers wherein monomers selected from the group consisting of conjugated dienes and conjugated dienes in admixture with vinyl substituted aromatic compounds, are combined with 0.1 to 5 millimoles of a halogenated compound per 100 grams of said monomers, said halogenated compound being selected from the group consisting of chloroprene, vinylidene chloride and a compound having a formula selected from the group consisting of:

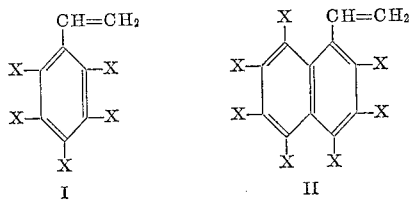

and

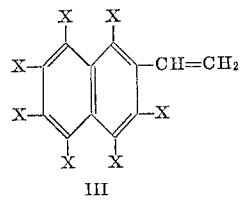

wherein X is selected from the group consisting of hydrogen, chlorine, bromine, iodine, alkyl containing from 1-6 carbon atoms and cycloalkyl containing up to 6 carbon atoms, the total number of carbon atoms in the X groups being not more than 6, when said compound has a formula selected from the group consisting of Formula I and Formula II at least one X is a halogen atom in the 2- or 4-position, and when said compound has Formula III at least one X is a halogen atom in the 1- or 3-position, contacting said combined monomers and said halogenated compound with an organo alkali metal catalyst under polymerization conditions and recovering a rubbery polymer product.

3. A process for making a polymer wherein a polymerization reaction mixture is formed by polymerizing monomers selected from the group consisting of conjugated dienes and conjugated dienes in admixture with vinyl-substituted aromatic compounds, in the presence of a hydrocarbon diluent with an organo alkali metal catalyst, said polymerizing occurring at a temperature in the range of −100 to 150° C., and at a pressure sufficient to maintain said reaction mixture substantially in the liquid phase, adding to said reaction mixture 0.1 to 5 millimoles of a halogenated compound per 100 grams of said monomers, said halogenated compound being selected from the group consisting of chloroprene, vinylidene chloride and a compound having a formula selected from the group consisting of:

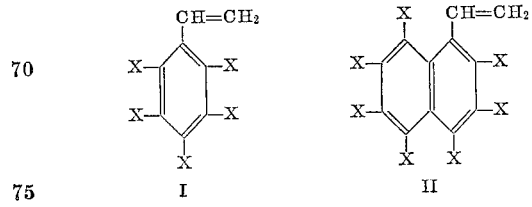

and

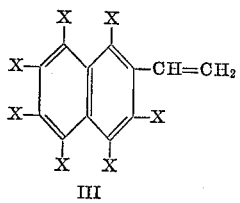

wherein X is selected from the group consisting of hydrogen, chlorine, bromine, iodine, alkyl containing 1-6 carbon atoms and cycloalkyl containing up to 6 carbon atoms, the total carbon atoms in the X groups being not more than 6, when said compound has a formula selected from the group consisting of Formula I and Formula II at least one X is a halogen atom in the 2- or 4-position, and when said compound has Formula III at least one X is a halogen atom in the 1- or 3-position, maintaining the added material in contact with said polymerization mixture at a temperature in the range of −100 to 150° C. for a period of from 10 minutes to 25 hours and recovering a rubbery polymer product.

4. A process for making polymers wherein monomers selected from the group consisting of conjugated dienes and conjugated dienes in admixture with vinyl substituted aromatic compounds, are combined with 0.1 to 5 millimoles of a halogenated compound per 100 grams of said monomers, said halogenated compound being selected from the group consisting of chloroprene, vinylidene chloride and a compound having a formula selected from the group consisting of:

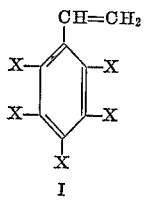 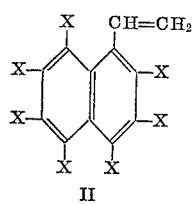

and

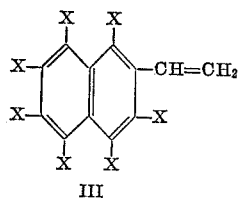

wherein X is selected from the group consisting of hydrogen, chlorine, bromine, iodine, alkyl containing from 1-6 carbon atoms and cycloalkyl containing up to 6 carbon atoms, the total carbon atoms in the X groups being not more than 6, when said compound has a formula selected from the group consisting of Formula I and Formula II at least one X is a halogen atom in the 2- or 4-position, and when said compound has Formula III at least one X is a halogen atom in the 1- or 3-position, contacting said combined monomers and halogenated compound with an organo alkali metal catalyst in a hydrocarbon diluent at a temperature in the range of −100 to 150° C. and at a pressure sufficient to maintain said reaction mixture substantially in the liquid phase for a period of from 10 minutes to 25 hours, and recovering a rubbery polymer product having a reduced tendency to cold flow and an increased Mooney viscosity.

5. The process of claim 3 wherein 1,3-butadiene is polymerized with n-butyllithium.

6. The process of claim 5 wherein the halogenated compound is 4-chlorostyrene.

7. The process of claim 5 wherein the halogenated compound is vinylidene chloride.

8. The process of claim 5 wherein the halogenated compound is chloroprene.

9. The process of claim 3 wherein 1,3-butadiene and styrene are polymerized in the presence of tetrahydrofuran with n-butyllithium.

10. The process of claim 9 wherein the halogenated compound is 4-chlorostyrene.

11. The process of claim 9 wherein the halogenated compound is vinylidene chloride.

12. The process of claim 4 wherein 1,3-butadiene is polymerized with n-butyllithium.

13. The process of claim 12 wherein the halogenated compound is 4-chlorostyrene.

14. The process of claim 4 wherein 1,3-butadiene and styrene are polymerized in the persence of tetrahydrofuran with n-butyllithium.

15. The process of claim 14 wherein the halogenated compound is 4-chlorostyrene.

16. The process of claim 14 wherein the halogenated compound is vinylidene chloride.

17. The process of claim 1 wherein said halogenated compound is added to said reaction mixture after the completion of the polymerization of said monomers.

References Cited

UNITED STATES PATENTS 2,384,535  9/1945  Craig _____ 260—74

FOREIGN PATENTS 462,384  1/1950  Canada.

JOSEPH L. SCHOFER, Primary Examiner.

STANFORD M. LEVIN, Assistant Examiner.

U.S. Cl. X.R.

260—82.1, 83.7